United States Patent [19]

Nelson et al.

[11] 3,844,468

[45] Oct. 29, 1974

[54] UNIVERSAL CARRIAGE APPARATUS FOR OPERATING ON PIPES AND ANALOGOUS WORKPIECES OF VARIOUS DIAMETERS

[75] Inventors: Jerome W. Nelson; James B. Andolph; Ford S. Miller, all of Houston, Tex.

[73] Assignee: CRC-Crose International, Inc., Houston, Tex.

[22] Filed: June 27, 1973

[21] Appl. No.: 374,050

[52] U.S. Cl. .................... 228/13, 198/184, 219/59, 228/29, 228/32, 266/23 K

[51] Int. Cl. .................... B23k 37/02

[58] Field of Search ............ 228/25, 29, 32, 45, 13; 219/59, 60, 68, 125; 266/23 K, 23 M; 198/184, 193

[56] References Cited

UNITED STATES PATENTS

| | | | |
|---|---|---|---|
| 2,705,629 | 4/1955 | Miller | 266/23 M |
| 3,441,191 | 4/1969 | Cerneau | 228/32 |
| 3,604,612 | 9/1971 | Miller | 228/29 X |
| 3,753,525 | 8/1973 | Homes | 228/32 X |
| 3,756,670 | 9/1973 | Harris | 228/29 X |

*Primary Examiner*—Robert D. Baldwin
*Assistant Examiner*—Robert J. Craig
*Attorney, Agent, or Firm*—Edwin M. Thomas

[57] ABSTRACT

A traveling carriage adapted to carry an operative tool, such as a welding head, cutter, heat treater, etc., and to be guided in a working plane along a curvilinear profiled path, especially around a cylinder, by a guiding track such as a flexible steel band, having a forward guiding edge and a rear traction edge both parallel to the working plane. The carriage comprises a rigid frame and/or a rigid axle, perpendicular to that plane, with at least two subframes adapted to be adjusted angularly with respect to each other to fit various curvatures or radii of work pieces such as large pipes. Guiding elements, preferably rollers on the carriage for guiding the carriage by the track edges are spaced equidistantly from and on either side of said axle. At least two such guiding rollers run on the front track edge and at least one other track contact member is located between them, running on the other track edge; the apparatus is particularly adapted for welding pipe lines where high precision of movement and high dimensional integrity of the carriage must be maintained. The geometry required for maintaining precision operations for different curvature adjustments is set forth.

26 Claims, 20 Drawing Figures

X X X $X_1$ f Q' 2 Q X' d h y e d $P_2$ $e_3$ e' 2' $e_4$ r' g j r' a'

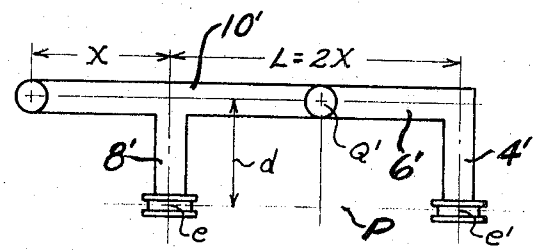
Fig. 1
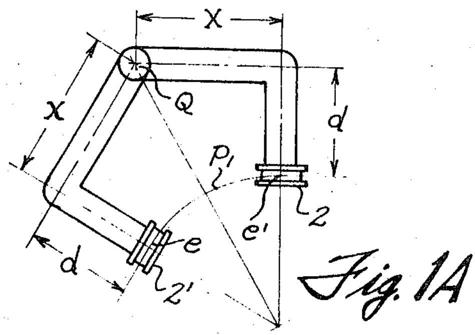
Fig. 1A
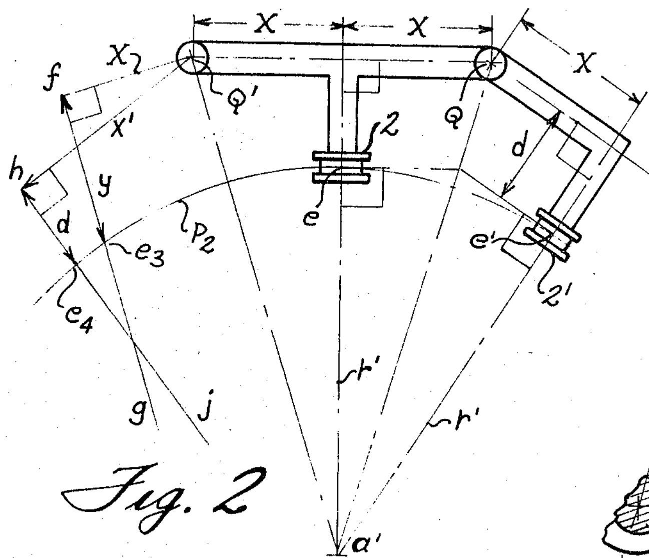
Fig. 2
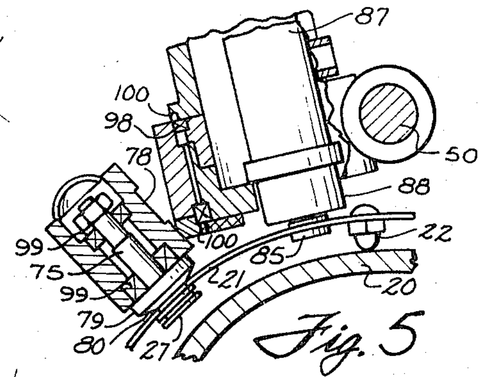
Fig. 5
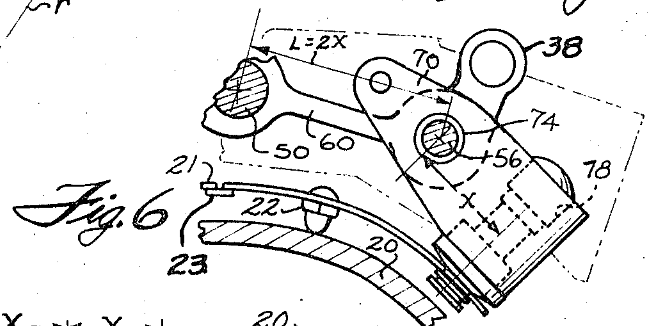
Fig. 6
Fig. 3
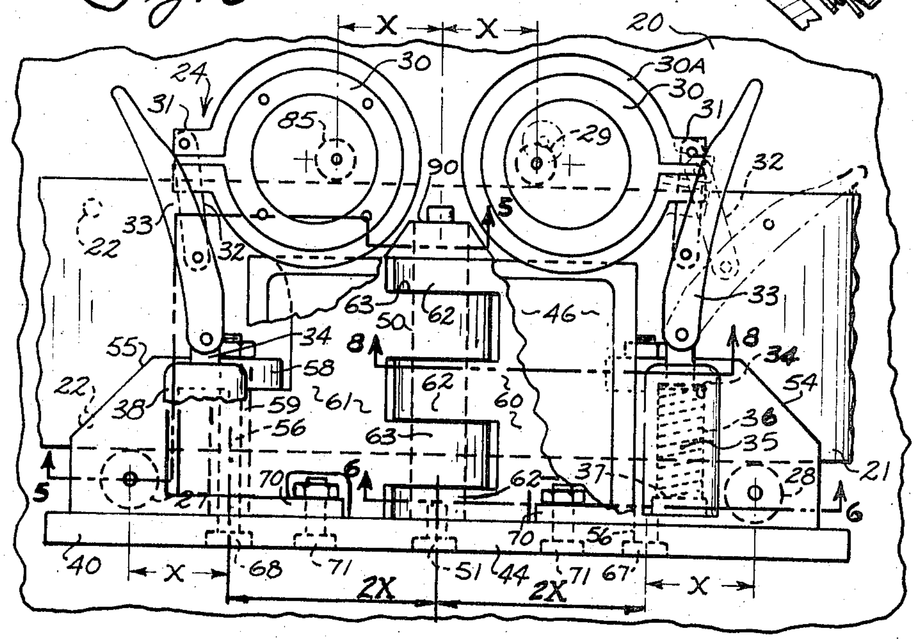

352
357
360
378
371
342
369
368
376
356
355
377
354
368
370
353
367
367
359
358
363
358
362
361
380
380
351

420
415
412
419
418
413
442
414
417
429
416
401
400
403
408
408
421
406
422
399
402
411
410
423
398
408
428
408
405
404

521
542
516
520
510
503
515
508
502
501

505
506

UNIVERSAL CARRIAGE APPARATUS FOR OPERATING ON PIPES AND ANALOGOUS WORKPIECES OF VARIOUS DIAMETERS

BACKGROUND AND PRIOR ART

Various proposals have been made in the past for performing operations such as cutting, machining, grinding, welding, heat treating and the like on the ends of or between adjoining hollow cylindrical work pieces such as large pipes and analogous bodies. Some of these proposals have involved the use of an orbitally traveling carriage mechanism which supports one or more operating tools that are guided around the work piece in a plane, such as the joint plane between adjoining lengths of pipe, by a guide track of some sort which surrounds or partly surrounds the work. Girth joints between lengths of large diameter pipes, as used in building pipe lines, have been welded in this manner, as shown in such patents as U.S. Pat. Nos.: 3,084,244; 3,084,246; 3,126,471; 3,193,656; 3,220,629; 3,256,418; 3,266,700; 3,268,707 and many others. Although some of these devices and methods have been used to a limited extent, in general, they have not been widely adopted or successful for various reasons.

In U.S. Pat. No. 2,705,629 to Miller, one of the present inventors, a carriage of rather simple type and a quick track therefor are described which have been used with success for carrying a cutting torch around large diameter pipes and the like in a working plane, i.e., an end plane transverse to the pipe axis. In U.S. Pat. No. 3,604,612, to Miller and Nelson, two of the present inventors, there is disclosed a welding carriage and track assembly designed particularly for joining the ends of large diameter pipes in such a working plane as in pipeline building, by arc welding the parts together in the joint plane. A flexible flat steel band serving as a cylindrical surfaced guide track is strongly tensioned around the pipe, being spaced radially therefrom by feet or studs resting against the pipe. The carriage mechanism is guided around the work by grooved or flanged idler rolls which engage the edges of this annular track or band. Propelling power in this case is applied through a friction drive roller, motor operated, which engages one edge of the band or guide track.

The system described in the Miller and Nelson patent, just mentioned, is designed to carry a welding torch around the work in the plane of the weld joint, or working plane, to perform a precision girth welding operation. The torch is supplied with electric current, inert gas to shield the weld against oxidation, etc., in the usual manner. The carriage propels the torch through an accurately controlled orbital path which lies in the working plane, i.e., in the plane of the joint being formed. The welding equipment, per se, is not part of the Miller and Nelson device nor of the present invention but may be of any suitable type, such as that described in U.S. Pat. No. 3,718,799, with further improvements described in a copending, commonly owned and assigned to the assignee of the instant application Pat. application Ser. No. 254,192 filed by Nelson, Pollock and Randolph, May 17, 1972.

The combination of the Miller and Nelson carriage and guiding mechanism with the welding apparatus just mentioned has been used successfully in welding long commercial pipelines. Strong girth joints are produced without flaws and at greatly reduced costs, compared with prior art methods. However, one disadvantage of the Miller and Nelson carriage is that it fits only one size or diameter of pipe. A different carriage must be used when another pipe diameter is involved. This, of course, adds considerably to costs and it is highly desirable to be able to use a single carriage for welding many different diameters of work. While it may still be necessary to use a different guide band for each diameter, the band is a relatively inexpensive piece of the equipment. The carriage is much more costly. One object of the present invention is to design a carriage of the general type described by Miller and Nelson, with its outstanding features of rigidity, dimensional stability, and dependability, which can be fitted to and used on workpieces such as pipes or pipelines, of widely differing diameters. For example, a single carriage may be used for welding pipe lines as small as 8 to 10 inches or less, and as large as 48 or more inches in diameter, according to the present invention. In some cases the carriage may even be adaptable to straight line operations.

In order to preserve the desired high rigidity and dimensional stability of the carriage, without substantially increasing its weight, the present invention involves structural features which include a rigid main or sub-frame including a pivot shaft, plus adjustable components which can be shifted with respect to each other about the pivot shaft or axis, or with respect to the work piece, but which can still be secured very firmly and rigidly to the rigid frame component or components. The welding of a narrow girth joint in a 48 inch pipeline, for example, may involve depositing molten metal in a gap of not more than one-sixteenth inch width. Obviously, the mechanism which carries a welding torch around a 48 inch diameter orbit and keeps the arc in the center of a kerf one-sixteenth of an inch wide, must operate with high precision. Any provision for adjustment to different diameters must not affect this high precision. Hence, another object of the present invention is to so design the carriage and its travel control components, i.e., retention or guide elements, etc., that it will not deviate from a true planar path or orbit by reason of having been reset or adjusted for work of a different diameter. At the same time, high accuracy of travel speed is equally important to formation of a good weld; a further object therefore is to so design the carriage and its operating and control mechanism that there will be no adverse effect on the accuracy of its speed control.

While specific reference has been made above to pipeline welding operations, there are other operations on pipelines that require carriage of an operating instrumentality around the work with high precision in the path of travel and/or high accuracy in the control of travel rate. Operations such as cutting with an oxy-acetylene torch, heat treating or annealing a newly welded joint to control hardness (see copending, commonly owned and assigned to the assignee of the instant application, U.S. application of Nelson, Randolph and Pollock, Ser. No. 254,653, filed May 18, 1972, for example), and other analogous operations, may be involved. Also, for workpieces other than lengths of pipe, the high precision guided carriage may be useful, as in forming a weld in other cylindrical workpieces or along a straight line joining two plates of metal, or operating along a convex or even a concave path profile, which is essentially circular, and the like. With a suitable guide track and retention or guiding elements on the carriage to cooperate with the track, obviously, the mechanism of the present invention may be useful for forming an inside weld or for performing other operations analogous to those described above.

In its broader aspects, then, the present invention is intended to relate to precision-guided operations of a traveling carriage, and to the necessary structural features of such a carriage which make it possible to adapt a single carriage to uses and operations of widely different curvatures. Orbital travel about outwardly convex cylindrical work pieces, i.e., along a circularly convex profile, is perhaps the most important single operation presently contemplated, but operations within concave travel profiles, or along a straight line (which may be considered a curved path profile of infinite radius) are considered to be within the broader purposes and uses of the invention.

The specific mechanism of the Miller and Nelson U.S. Pat. No. 3,604,612, mentioned above, includes a flexible or distortable track member especially a flexible steel band, which can be tensioned around (or along) a path where the carriage is to travel. For cylindrical work pieces, such as lengths of large pipe, the ends of the band are joined together to form an endless track, particular provision being made to bridge over the gap between the joined ends to prevent any jogging or misalignment of the carriage as it travels across this gap. The carriage is equipped with a pair of guide and retention elements, in the form of flanged or grooved guide rollers or wheels rather widely spaced apart along the travel path (circumferentially about the work) along one edge of the track, and at least one additional flanged or grooved roller or wheel adjacent the opposite edge of the track. The latter may be directly opposite either of the first two guide wheels, but more generally is not in axial alignment. In any case, it is preferred to include an element to prevent misplacement or misalignment of the carriage with respect to the track when the traction drive means is disengaged but the carriage is still on track. Three rollers or followers preferably are all idlers, i.e., are non-driven in the usual case. A fourth driven roller or wheel normally is a traction drive member, usually friction surfaced and not flanged. It is motor driven and adapted to strongly engage an edge of the track by tractive friction to propel the carriage along the track in its intended path or orbit. Preferably, the drive or traction roller is placed on the same side of the track as the third guide or idler wheel, it being borne in mind that the latter is mounted on the carriage, at a point across from but usually between the first two guide rollers. Preferably, two idler guide rollers on the front of the track are mounted with their axes of rotation fixed in the carriage, whereas the single idler guide roller and the driver or traction roller on the rear are mounted independently of each other so that their axes of rotation may be shifted laterally, i.e., towards and away from the adjacent edge of the guide track. The reason for this, as suggested in the patent, is that it is desirable to be able to run the carriage around the track manually, e.g., for positioning it as for starting a weld, etc., and the drive or traction roller must be disengaged from driving relationship to permit this. At the same time, the third or idler guide roller should not be disengaged, or the carriage would drop off the track. For full removal of the carriage from the track, of course, both rollers, driver and idler, on one track edge, are to be shifted away from engagement with the track. In the patented construction, this shifting is accomplished by mounting the axles or shafts of the two shiftable members in rotatable eccentric mountings; by rotating one or both such mountings, the desired selective shifting may be accomplished.

When the shiftable structures described above are to be incorporated into a carriage whose travel radius and whose own curvature are to be changed or adjusted to fit different work diameters, complications arise. The roller axes must or preferably should be aligned radially with respect to the path and to the guide track engaged by the rollers; at the same time they must be so positioned that the grooves or flanges properly engage the track edge. In other words, they must align tangentially as well as radially with the guide track and without binding or undue friction. To accomplish this, for all adjustments of curvature, is a further object and feature of the present invention. At the same time, in order to preserve the high rigidity and the fine precision and dimensional stability, mentioned above, while keeping weight to a minimum, the parts must be kept as simple and rugged as possible. Such is another object of the invention.

One aspect of the present invention is the discovery that by a simple and orderly arrangement of spacing the retention or guide and driving elements circumferentially about or along the track or travel path, all of them, i.e., the guide and traction wheels if properly spaced on the carriage may be made to conform radially and tangentially to that path, regardless of their number, sequence, or specific function. Thus, a drive or traction roller may be substituted for an idler guide roller in one place or another, or vice versa; three guide rollers or more may be used on one or both edges instead of one or two, or a flanged guide roller may be used also as a drive roller; two drive rollers instead of one may be used on one side or on both sides of the track where the apparatus to be carried by the carriage is unusually heavy or where the nature of the track and the frictional characteristics, or power characteristics, of the traction elements make this necessary. To provide such versatility, while keeping the carriage simple, yet adjustable for different curvatures, and permitting ready and facile substitutions of components, is a still further object of the invention.

In commercial building of pipe lines, a crew or "spread" may require quite a number of welding units and carriages to mount them on, along with other equipment, such as joint heaters or treaters, cutting torches, grinders, etc., which also require carriages. In order to minimize equipment costs, it is desirable to use standard "off the shelf" components such as sealed ball bearings, and other standardized or readily procurable parts, as far as practicable. Also, since a substantial number of "fixed" or single diameter size carriages of the type referred to in the Miller and Nelson patent are already in service, a large number of spares and replacement parts already are available, and others are readily procurable, it is desirable to design the adjustable carriages of the present invention to use the same components, where practicable. Furthermore, operating personnel have become accustomed, in many cases, to certain structural and functional features which have proved to be highly useful in the Miller and Nelson carriage and the general structure and main features of that carriage are to be retained, according to a preferred aspect of the present invention.

On the other hand, certain other advantages may be derived by departing from specific arrangements in the Miller and Nelson carriage. Hence, certain modifications of the present invention are designed to gain such advantages. For simple rigidity like that of the patented carriage, a unitary front plate structure is used where requisitive adjustments can be made. The patented arrangement of two front edge guides, in the form of grooved or flanged idlers widely spaced from each other along the track is advantageously retained, while arrangements for cooperating idler or idlers at the opposite edge of the guide track may be varied to obtain certain other advantages. Thus, a further object of the invention is to maintain the required simplicity and integrity of solid construction and to obtain improved interchangeability of parts, while permitting substantial variations in design for optimizing other aspects to meet particular needs.

While a number of modifications and embodiments are described hereinbelow, major advantages are retained throughout, including simplicity, minimal weight, use of standard or readily replaceable parts, and flexibility to provide ample or supplemental drive power for heavy loads or adverse operating conditions. The advantages of single drive are kept available for situations where greater drive power is not needed, and other options are available, all within the spirit and scope of the invention, as will be described hereinafter.

BRIEF DESCRIPTION OF DRAWINGS

FIG. 1 is a diagrammatic view showing geometry features which require a particular arrangement and spacing of guide or track retention devices, to accommodate adjustment to different curvatures.

FIGS. 1, 1A and 2 are related diagrammatic or geometric views.

FIG. 3 is a top or plan view of a first modification of the invention.

FIG. 5 is a fragmentary vertical sectional view of part of the apparatus of FIGS. 3 and 4, with certain parts omitted, taken substantially along line 5—5 of FIG. 3.

FIG. 6 is another fragmentary sectional view, taken along line 6—6 of FIG. 3.

DESCRIPTION OF PREFERRED EMBODIMENT

Figure 4:
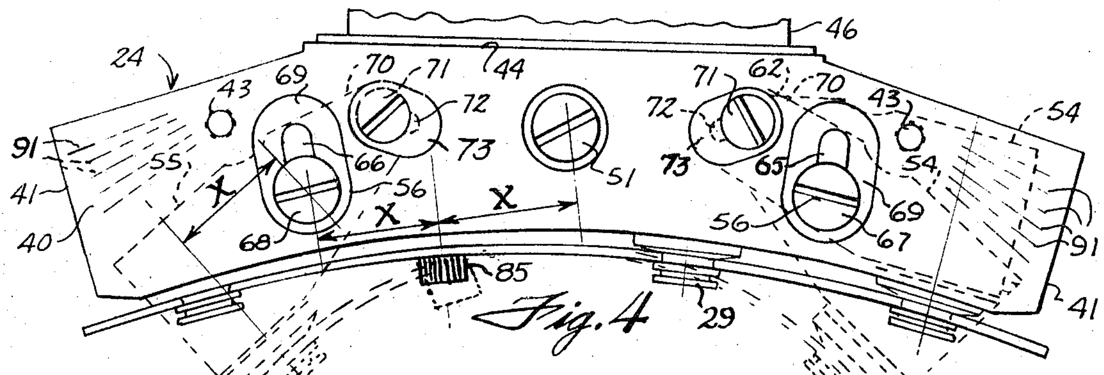
FIG. 4 is a front view of the structure shown in FIG. 3, certain parts being omitted.
Figure 7:
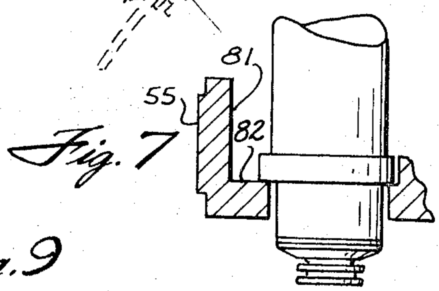
FIG. 7 is a fragmentary detail view, partly in section, showing a grooved motor driven traction roller and its mounting.

Before proceeding to a detailed description of apparatus or mechanism, a brief discussion of geometry involved will be given. Referring to FIGS. 1, 1A and 2, different paths of travel to be followed by a guiding or retention element of the carriage are indicated as being straight (infinite radius) at P, FIG. 1, of sharp curvature (short radius) at $P_1$, FIG. 1A, and of less curvature (longer radius) at $P_2$, FIG. 2. Assume that point *e*, in each of the three figures is a point of contact between a carriage-guiding track follower member, shown herein as a guide roller or idler 2, and the track at P or $P_1$, FIGS. 1, 1A, or track $P_2$, FIG. 2. The axis of the track follower or roller passes through the central axis of the path of its travel which also is the axis of the cylindrical piece of work, such as a pipe and the central axis of the guide track. These two axes of course normally coincide. Assume further, that point e or e′ is mounted on an angular arm 4, 6, at a radial distance (on a radius to the axis of the work and of the travel path) of *d*, and offset laterally (on a line perpendicular to the radius) through a frame adjusting axis Q. That is, the offset line is parallel to a tangent to the travel path P, $P_1$, the offset distance from the nearest axis Q being shown at X. Now, if the carriage were a fixed rigid body, for the curved travel path $P_1$, FIG. 1A, with the two respective arms fixed at a fixed point Q (on the carriage not shown), element *e* of guide roll 2 and element *e′* of guide roll 2′ are both lying on radial lines *ae* and *ae′* at distances *r* from the axis *a* and the angle between their axes (these radii intersect at axis *a*) is twice the angle whose numerical tangent equals X, divided by $(r+e)$. A line from point Q through the axis *a* obviously bisects this angle. Distance d, of course, is the distance by which the carrier for *e* or *e′* is set radially away from the track P.

Now, if a mechanical pivot point is established at point Q, FIG. 1A, so that the axes *ae* and *ae′* can be changed in direction to intersect at a greater distance *r′* from each point *e* or *e′*, the same relationships still apply. That is, the angle between lines *a′e* and *a′e′*, FIG. 2, is still twice the angle whose tangent is X divided by $(r'+d)$. In FIG. 1, the lines through *e* and *e′* are parallel (for straightline travel). Here, the radii become infinite but the distances or lengths or arms 4′, 6′, and 8′, 10′, are unchanged. A line through point Q′ and perpendicular to the path of travel P would be half way between the two axes 4′ and 8′ and parallel to them. In FIG. 2, lines through the center of axis *a′* and points *e* and *e′* coincide with the axes of the track following members elements 2 and 2′. These members still run truly tangentially along the travel path $P_1$ or $P_2$.

However, if the distance d should be changed, as to *y*, FIG. 2, without changing X, a line *fg*, perpendicular to *f*Q′ and coinciding with the track follower axis at *e*3, would not intersect the axis *a* and the follower would not move tangentially to the path $P_2$. There would not then be true rolling contact between the follower *e* or $e'$ and the track, and there would be binding or friction between the guide roller and the edge of the guide track. Similarly, if $d$ were kept constant, but a new value $x'$ were chosen to replace X, a line $jh$, perpendicular to $hQ'$ and coinciding with the axis of element $e4$, would not pass through axis $a$. Obviously, a member 2 or 2' could not make proper contact with the track and the desired guiding function would not be established. In other words, a point of pivoting, for changing the curvature of a carriage for a smaller and larger diameter track, must lie on the bisector of the angle between the axes of the rolling elements, that is midway between them, when these axes both pass through the center of track curvature or work axis $a$ or $a'$. Or, to put it another way, if the carriage has two (or more) pivot axes, to permit the angle adjusting components thereof to move to different radial angles, to accommodate work of different diameters, the axes of the rolling elements must lie midway between the two adjacent pivot axes. Further, the radial distance d must be equal for all track followers. These principles are to be kept in mind as the detailed description proceeds.

The embodiment of the invention described in connection with FIGS. 3 to 8, inclusive, makes use of three equally spaced pivots or axes for angular adjustment, the rollers which contact the guide track being geometrically located with respect to these axes, according to the above discussion. In each case, the point of contact between carriage and guide track lies half way between the pivots or hinge points, or an equal distance outside of them. The idler and other rollers, set at the edges of the guide track, are then tangentially and properly aligned with the guide track, their axes being properly radial or perpendicular to it. Essentially the same idler wheels, drive rollers, bearings, and adjustment assemblies are used in this embodiment as in the Miller and Nelson patent device. A rigid front plate 41 serves as a reference surface as well as a support for the welding head or other operating instrument. It is drilled and slotted as shown in FIG. 4, so that the relatively adjustable axles or shafts and associated parts may be correctly located and firmly secured, regardless of the diameter of pipe or of the travel path to which the carriage is being adjusted.

A control box 46, which regulates speed of travel and initiates other operations, such as electrode wire feed to the welding nozzle, turning on of shielding gas, etc., is mounted on top of the fixed front plate, with an additional fixed support at the rear, i.e., on the rigid main axle shaft, so as not to be disturbed by adjustments of the carriage for work of diffeent diameters. The carriage has two front idler guide rollers spaced outboard, i.e., relatively far apart along the track, to give it excellent stability on the track, while the wheels on the rear edge of the track are set closer together and are selectively and individually engageable and disengageable with the track edge. This permits running the carriage along the track manually; it also permits independent engagement of the drive for normal automatic operation, and it further permits disengagement of both idler and drive for complete removal of the carriage from the guide track.

Rear guide and drive rollers are mounted eccentrically in rotatable housings or supports and sealed by use of O-rings 100, FIG. 5. Other suitable dust and water tight seals and/or sealed ball bearings may be used for dependable operation over very wide temperature ranges and under the most adverse field conditions. The front idlers also are preferably enclosed in sealed dust tight bearings which may be standard off-the-shelf items, costing much less than specially made parts. The carriage of FIGS. 3 and 4 may be adjusted to accommodate pipes as small as 8 inches in diameter, and up to straightline operation (infinite work radius).

Referring further to FIG. 3, there is shown a portion of a workpiece 20, such as a large pipe, to which a guide track or cylindrical band 21 is attached, its accurately formed front edge being carefully and accurately located with respect to a plane end of the pipe where a joint, for example, is to be welded. Guide band or track 21 is spaced radially away from the pipe 20 by feet 22 which rest on the surface of the work. Tensioning means, not shown, keep the band tightly in place; a bridge element 23, FIG. 6, is provided to guide the carriage across the joint in the band, to avoid any jolting or misplacement of the carriage at this point. A further description of these parts is found in the Miller and Nelson U.S. Pat. No. 3,604,612, mentioned above. A carriage 24 is adapted to run on track 21, being guided for highly accurate travel by a pair of rather widely spaced grooved idler guide rolls or wheels 27 and 28, which engage the front edge of the band, as seen in FIGS. 3 and 4. This engagement is between flanges on each wheel 27 and 28.

A single guide roller or idler 29 is mounted to engage the rear edge of band or track member 21. This idler has its axis mounted eccentrically in a rotatable support member 30, as in the aforesaid patent. A radially projecting arm 31 is pivotally connected to a link 32, the other or front end of which is connected to a toggle lever 33. The toggle lever is pivotally connected to a slidable plunger 34 adapted to push against a compression spring 35 in a bore 36 formed in a boss member 38. A screw plug 37 can be screwed in or out to adjust the pressure of spring 35 on plunger 34 and thus to control the force by which the eccentric mounting 30 holds roller 29 in engagement with the rear edge of track 21.

The front and main rigid member of the carriage 24 is a plate 40, thick enough to make sure that there will be no bending or distortion of the carriage during its operation. This plate has the general shape shown in FIG. 4, with ends 41 which converge downwardly slightly. A plane front face mounting surface is provided to which operating instruments, such as a welding torch or the like, may be attached, as by drilled and tapped openings 43 for bolts or screws. A plane upper edge surface 44 supports the front edge of a control box 46 which houses electrical and/or electronic control equipment for starting, stopping, and otherwise controlling operation of the carriage and of equipment carried thereby. The latter forms no part of the presend invention.

In the middle of the main rigid frame member 40 a rigid hinge pin or axle member 50 is firmly attached at its front end by means comprising a screw or bolt 51. On the right and left of the frame member 40 are securely attached a pair of C-shaped brackets 54 and 55. These members are mounted on the rear face of plate 40 by bolts 56, which pass through a forward arm 57 and a rearward arm 58 of each C-bracket 54 or 55. Each of bolts 56 passes through an ear 59 of a subframe member 60 or 61. Bolt 56, in each case, constitutes a hinge pin or axis for adjustment angularly of the C members 54 or 55. Ears or tongues 62 and 63 of members 60 and 61 are pivoted on pin 50 for relative angular adjustment with respect to each other. Bolt 56, in each case, can be loosened to swing it through an arc about the axle or pin 50 and is thereafter clamped there, by tightening bolt 56 in the desired position in the slot 65 or 66 through the bolt head 67 or 68 which seats in an arcuate recess 69 in each case. For further security against loosening or moving of C members 54 or 55 about bolts 56 when bolts 56 are tightened, an ear or tang arm 70 on each of them is tightly clamped against the rear face of plate 40 by a bolt 71 which can be set in a desired position in arcuate slot 72 in tang arm 70 centered on bolt 56 with its head in a recess 73 of similar shape.

The C members 54 and 55 serve to mount the front guide idler rollers 27 and 28. As best shown in FIG. 5, roller 27 is mounted on a shaft 75 which is fitted in sealed bearings 99 in a suitable opening 78 in C member 55. An enlarged flange 79 above the grooved roller 27 has a beveled under face 80 which assists in guiding the carriage onto the track as it is being attached. To make sure that the grooved or flanged roller 27 is at the right height in its mounting for proper running along the track, machined surfaces 82 in the opening 81 in member 55, may be cut to the precise level desired and other mounting or bearing elements are machined to accurate surfaces 83 as required. See FIG. 7. This insured that the roller 27 will be at the exactly correct level, measuring from the axis *a* of the path and the workpiece. The roller 28 at the right may be similarly mounted. Each of them has preferably two grooves and/or three flanges, the upper or outer groove to ride the edge of the track 21 in the upper groove and the lower or inner groove to ride the bridge 23, FIG. 6, carrying the carriage smoothly across the gap in the guide track to prevent even a slight jostling or misalignment of the carriage as it crosses the gap between the track or band ends.

Figure 8:
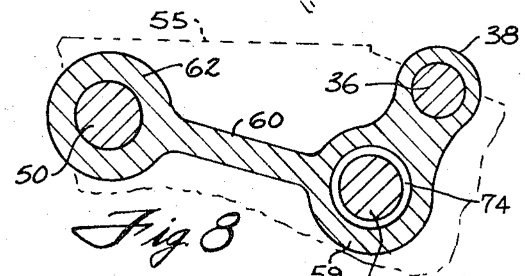
FIG. 8 is another sectional view taken substantially along 8—8 of FIG. 3, certain parts being omitted.

As shown best in FIGS. 6 and 8, the sub-frame member 60, mounted on the fixed main pivot or hinge shaft 50 at its inner end and on a bolt or shaft 56 (with intervening bushing) at its outer end, also embodies an upraised boss member 38, identical with that at the left of FIG. 3, as already mentioned. Hence, as members 60 and 61 are moved to different angles with respect to each other and about the hinge pin 50, the compression spring 35, plunger 34, and associated parts in box 38 are moved into position with it. The toggle lever 33 and linkage at the right, FIG. 3, are identical with those of the left and need not be described in detail. In some cases, instead of mounting an idler wheel such as 29 in the eccentric support 30, if needed, a flanged friction driver roller 85 can be mounted so as to be in driving engagement with the back edge of the track (as seen in FIG. 3) when the toggle lever 33 is in the upright or locked position. The idler 29 (or a driver such as 85, if used) is out of engagement with the track edge when the lever 33 at the right is in dotted line position. As the shifting mechanisms for rollers 29 and 85 are alike and interchangeable, so also can either a guide roller of the idler type 29 or a driver roller 85, of unflanged and knurled type, together with its drive motor 87 and gear reduction mechanism 88 be mounted in either or both of the rotatable housings or mountings 30. When a particularly heavy instrument is to be carried, such as a post heater or annealing mechanism mentioned above, it may be desirable to have driver rollers in both of the housings; ordinarily, it is preferred to have one flanged idler and one non-flanged or non-grooved driver on the rear and two flanged idlers on the front of the carriage.

A bracket 90 is supported on the rigid rear end of the main hinge pin or shaft 50 and a flat upper surface thereon provides a support for the back side of the control box housing 46. Housings 30A for eccentrics 30 are preferably formed integrally with the respective sub-frames 60 and 61; the essential frame assembly thus consists of rigid front plate 40, main shaft 50 which is rigid with plate 40, the sub-frames just mentioned with their eccentric housings, and the C-clamp or bracket members 54 and 55, in which the front idler guide wheels are mounted. As clamped and tightened together the whole carriage is firm and solid, rigid enough to carry the operating equipment without deviation from the travel path directed by the front edge of guide band or track 21. This front edge, not being worn by the friction drive rollers 85, tends to remain straight and true.

As shown also in FIG. 3, the centers or axes of the rear rollers 29 and 85 are located to the right and left, respectively, of the axis of main hinge pin 50 by a distance exactly equal to X, the distance L or 2X being the total between these two rollers when set for straightline carriage travel. As pointed out above, this spacing or offset of rollers with respect to hinge axes is important to make sure that these rollers will all properly run on the track for different track curvatures while they perform their guiding or driving functions. Similarly, the front guide rollers 27 and 28 are mounted in the adjustable swinging arms or C-brackets 55 and 54, respectively, the same distance, X or L/2 outside of the secondary pivot shafts or bolts 56. The latter in turn, are spaced a distance X or L/2 to left and right, respectively from the rear rollers 85 and 29. The distances referred to are the distances along perpendicular lines to their respective radial arms which pass through the adjusting axis or axes, not the projection of such distances on a plane when the path to be followed is cured. For running on a flat or straight path profile, the two would be identical; in all other cases the offset distance from the radial is greater than the projection and is controlling. See FIG. 6.

To assist in locating the bolts 56 in slots 65 or 66, and for positioning the C members 54 and 55 properly, to fit a desired curvature or work diameter, scales or verniers are marked on the rear face of front plate 40, as indicated at 91, FIG. 4. The operator may bring the top surface or other appropriate reference point on the member being adjusted, such as a sub-frame 60 or 61, and a member 54 or 55, in line with the appropriate mark, as will be obvious. In FIG. 4, the carriage is shown in full lines as set for a pipe or workpiece of large diameter and in dotted lines as set for a piece of smaller diameter.

As indicated above, this embodiment operates essentially in the same way, is similar in general mechanical arrangement, and uses the same types of rollers, bearings, and other components interchangeable with the apparatus of the Miller and Nelson patent. The present invention makes the carriage adaptable to precision use with many different sizes or diameters of work.

Figure 9:
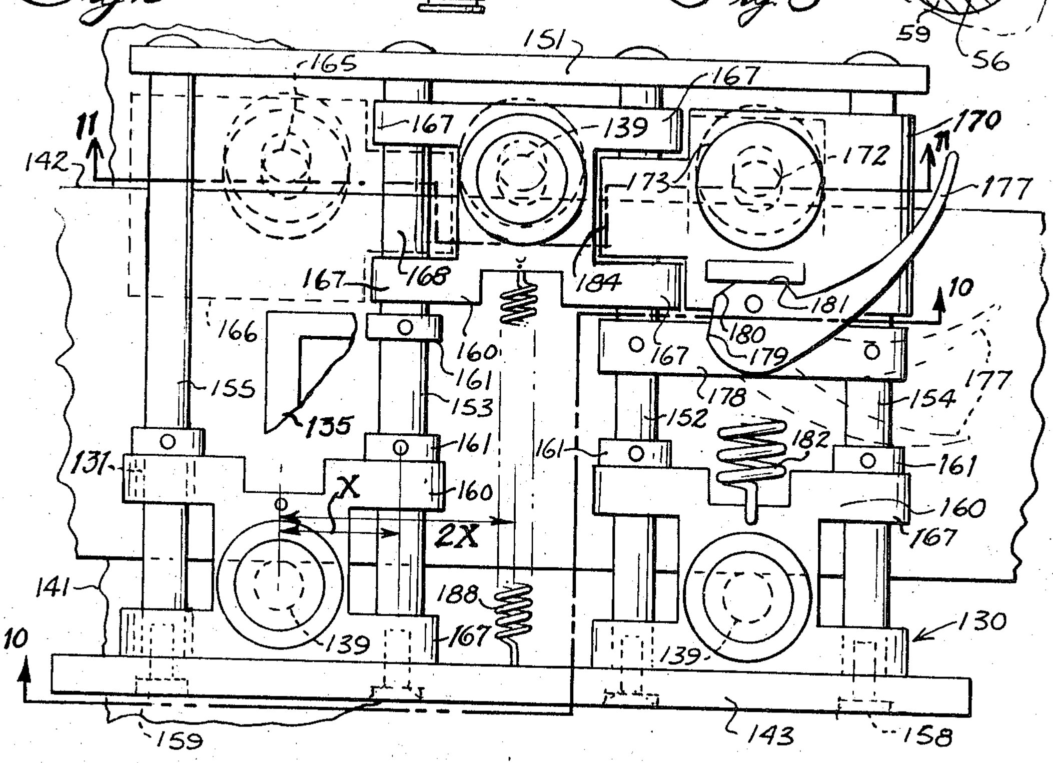
FIG. 9 is a plan view, generally comparable with FIG. 3, of another modification.
Figure 10:
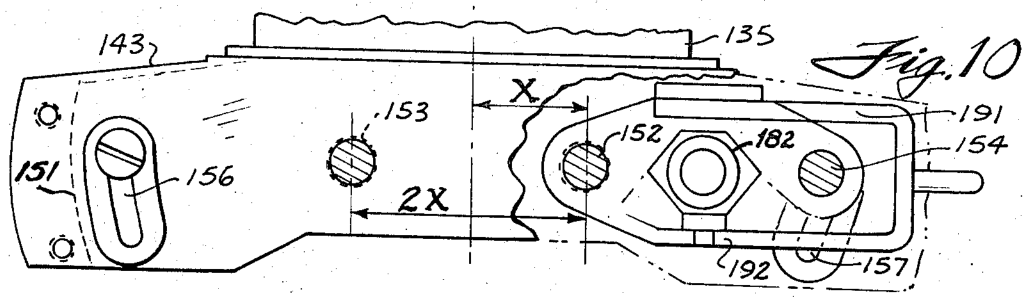
FIG. 10 is a vertical and partly sectional view of the structure of FIG. 9, taken substantially along line 10—10, of FIG. 9.
Figure 11:
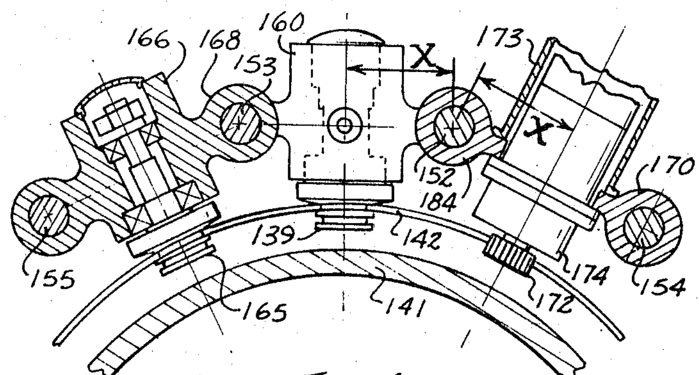
FIG. 11 is another sectional view taken along line 11—11 of FIG. 9.

FIGS. 9, 10 and 11 show a second modification which nevertheless retains many of the advantages of the first described. The carriage here has two parallel pivots or hinge axes perpendicular to the work plane for adjustment to set the carriage for different work diameters. One pivot axis is on either side of the center of the carriage, with two spaced front guide idlers and a single rear idler guide centered between them. Here again, the spacings between idler guide wheels and the pivot or hinge axes must be equal to each other and half the distance between adjacent axis in order to maintain tangency and alignment of the idlers with the track as the carriage is set for different sizes of pipe. The front idlers and their mountings are alike; the rear idler could be similar but must be mounted so that it can be shifted away from the edge of the guide band or track 142 to secure or detach the carriage to or from the track. The arrangement in FIG. 9 is such that the two front idlers 139 and the central roller at the rear, form the apices of an isosceles triangle. A single drive roller also can be set directly opposite or axially of the work behind one of the front guide rollers. A double drive may thus be used, if desired, i.e., a friction drive roller may be set opposite or behind either of the front idlers. This double drive may be needed for heavy operations, such as postheating, or in cases where the band is worn or wherever traction by a single drive may be insufficient or unreliable. A true and reliable travel speed is often critical, particularly in pipe line welding operations.

The two main pivot or hinge shafts 152 and 153 are secured at their front and rear ends respectively to front and rear plates 143 and 151 to make a sturdy frame. Rigidity is augmented by securing shiftable hinge axles or shafts 154 and 155 firmly and rigidly to the front plates through arcuate slots 156 and 157, FIG. 10, in much the same manner as in FIG. 3. The front plate acts as a reference surface, by which other parts may be adjusted and secured for excellent alignment and rigidity.

In the first embodiment, FIG. 3, described above, tension of the guide and drive rollers against edges of the band or track member was maintained by compression springs, acting through toggle members. In the present instance, tension rather than compression springs are used, a relatively light one for holding the rear idler against the band, as needed for manual seifting of the carriage without power drive, and a much heavier one for holding the driver roller in firm frictional driving engagement. Where dual power drive is employed, an additional spring may be used, if required. In this case, a single control lever, through cam means operative in multiple positions, is used to engage the drive roller only or the idler roller in addition. Where a central drive roller is used in addition to the first driver, it will have a separate shifting mechanism, not shown, e.g., at the rear.

As in the first modification, a control box 135, FIG. 10, is mounted on non-adjustable parts of the carriage, namely, the front of the box on the upper edge of the front plate and the rear part of the box on the two main hinge shafts 152 and 153 which are fixed to the front and back frame plates. In the form illustrated, the carriage is readily adjustable to work with an 8 inch pipe and may be adjusted to run straight out, i.e., with infinite radius. Wider ranges may be obtained by modifying or replacing the front and back plates, all other parts being usable for any reasonable travel curvature or profile.

FIG. 9 shows carriage 130 with its two front guide rollers 139, spaced respectively to the right and left of carriage center by a distance 2X, the main hinge shafts or pivot axes being half way between the center line and these rollers. Guide band or track 142 is secured to workpiece 141, as in FIG. 3. Two idler guide rollers, 139 and 165, grooved to engage the edge of band 142 at the rear are shown one mounted in the rear center and the other directly behind the left front roller 139, respectively. For a center rear traction drive only one of the corner idlers is needed. Rigid front plate 143 and supplemental rear plate 151 are firmly bolted together through shafts 152 and 153 and rods 154 and 155, as noted above. The ends of rods 154 and 155 are secured by screws 158 and 159 in arcuate slots 156 and 157; loosening these permits shifting in the slots to accommodate guide tracks and work pieces of different curvatures. These arcuate slots are centered, of course, on the main hinge axes 152 and 153. Three identical housing members 160, of roughly H-shape, are mounted on the axles 152, 153 and on the shiftable rods 154 and 155. One such housing is provided for each of the three idler guide rollers 139 and their mountings. Each member 160 has four arms 167; each arm is press fitted with a bushing 131 which is free to turn or slide on the shaft or rod it embraces. Collets 161 are pinned to shafts 154, 152, 153, and 155, respectively, to prevent the front housing members 160 from sliding towards the rear, under the influence of tension springs mentioned below. The rear center housing 160 is free, however, to slide forward to a limited extent, as is housing 170.

Two other housings 166 and 170 of roughly T-shape may be mounted also slidably on the rods mentioned above, for supporting rollers for driving and/or guiding the carriage along the rear edge of the band 142. In many cases housing 166 is not needed and can be omitted. Or, the rear left may carry no roller at all; it is shown as housing an extra idler roller 165 and its bearings which may be similar to or identical with rollers 139 and their bearings. Alternatively, as suggested above, if desired, this rear left idler roller 165 may be replaced with a drive member, such as shown at 172 at the right. See particularly FIG. 11. Left rear housing 166 has a stem or ear 168 which projects to the right, as seen in FIG. 11, between ears 167 of of center rear housing 160, all of which embrace the hinge shaft 153. For the left housing, 160, a separate moving mechanism, not shown, may be provided.

At the rear right, housing 170 is formed much like housing 166 but it mounts a motor 173 and associated gear reduction box 174, to which a drive roller 172 is secured. A stem or ear 184 projects leftward from housing 170 between ears 167 extending to the right from rear housing 160 to embrace shaft or hinge axle 152. There is some clearance along shaft 152 between these parts so that the housing 170 may be moved forwardly or backwardly a short distance without requiring that the rear housing 160 slide with it.

A cam lever 177, pivoted for rotation on a bracket or platform 178 fixed to shafts 152 and 154, has three acting cam surfaces 179, 180 and 181, located at progressively decreasing distances from its pivot point. Each of these is a flat or dwell surface designed to abut against a plane surface on the front of housing 170 and to position the member 170 at different positions against the force of a strong tension spring 182 secured between housing 170 and the front right housing 160. When surface 181 is opposed against housing 170, as shown in full lines, FIG. 9, spring 182 pulls the housing forward to fully engage the drive roller 172 with the rear edge of band 142. If motor 173 is then operated, the carriage will be driven along the band. If the lever 177 is moved to the intermediate position, as shown in dotted lines, surface 180 engages the housing 170 and removes the driver 172 from engagement with the band. However, idler guide roll 139 is still engaged with the band and the carriage will remain on the track for free manual movement along the track, without falling off, if desired. If the lever 177 is moved still further, to the extreme dotted line position, surface 179 of the cam now engages the housing 170, moving it still further to the rear and against the tension of spring 182. When this occurs, the stem 184 of housing 170 will engage the rearmost tongue 167 of housing 160 and compel this housing, which carries the intermediate rear idler guide roller 139, to move rearwardly. This disengages roller 139 from the track, freeing the entire carriage from the track. In case there is a left rear housing 166, this housing also may be moved to the rear in a sliding action by mechanism similar to cam lever 177, etc. Housing 166 is shown in dotted lines only in FIG. 9.

A tension spring 188 which is considerably lighter than spring 182 tends to hold the central rear idler 139 in engagement with the rear edge of band 142 unless the latter is forced away by operation of cam lever 177. Since spring 182 is very strong, a binding tendency of the members 160 and 170 as they slide on the rods 154, 152, and 153 may appear. To overcome this it may be desirable to modify cam lever 177 to make it bifurcate. Such an arrangement is shown in FIG. 10, at the right, where upper and lower webs 191 and 192 of the cam lever are arranged to press, respectively, against upper and lower face elements of housing 170, distributing their forces symmetrically above and below spring 182.

The arrangement of FIGS. 9 to 11 is versatile, in that only one rear guide roller 139 and one drive roller 172 need be used, if desired, or an additional guide roller such as 165 may be inserted in housing 166 with the driver in the center and idlers outboard at the rear, or a drive roller, similar to roller 172, may be mounted in the left housing 166, as suggested above, to give dual drive. One of the drive rollers, if two are used, may be of the flanged type, although, as a general rule, a friction surfaced drive roller without flanges is preferred for engaging the edge of the band for driving purposes. The spacing between rollers and hinge axes is as described above, the rollers which engage the edges of the band being half way between the adjacent hinges or pivot axes, i.e., a distance X or L/2. This relationship is shown in FIG. 11. FIG. 10 shows the spacing between the parts as the apparatus is set for a straight line run whereas FIG. 11 shows them set for a small circular path.

Figure 12:
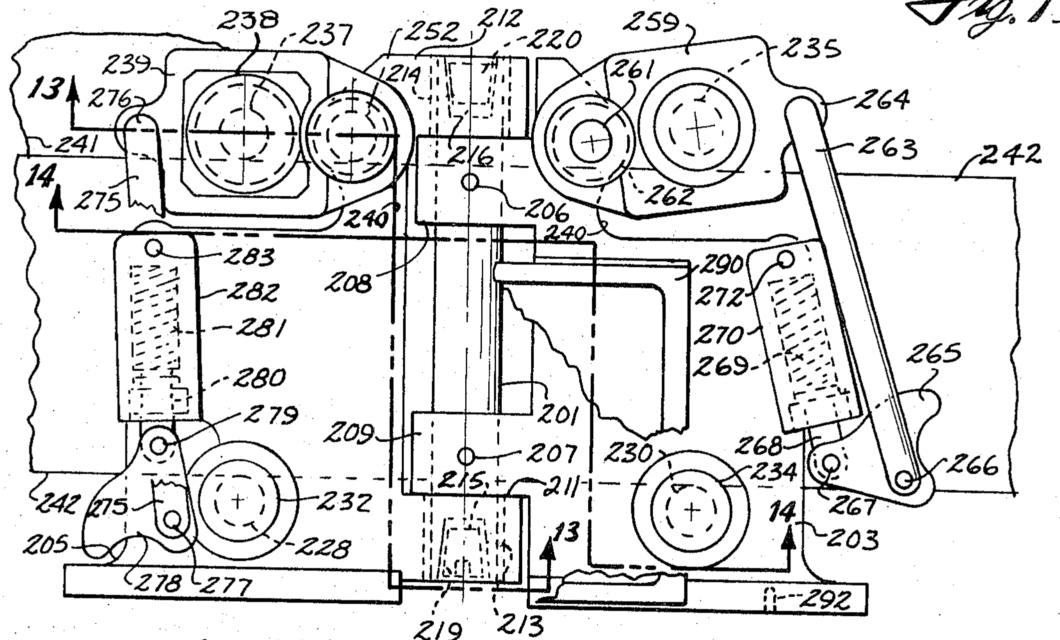
FIG. 12 is a plan view of still another modification.
Figure 13:
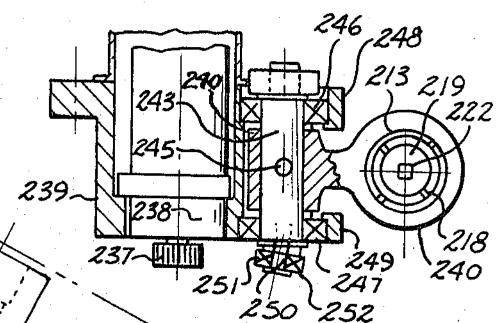
FIG. 13 is a fragmentary vertical sectional view, taken substantially along line 13—13, of FIG. 12.
Figure 14:
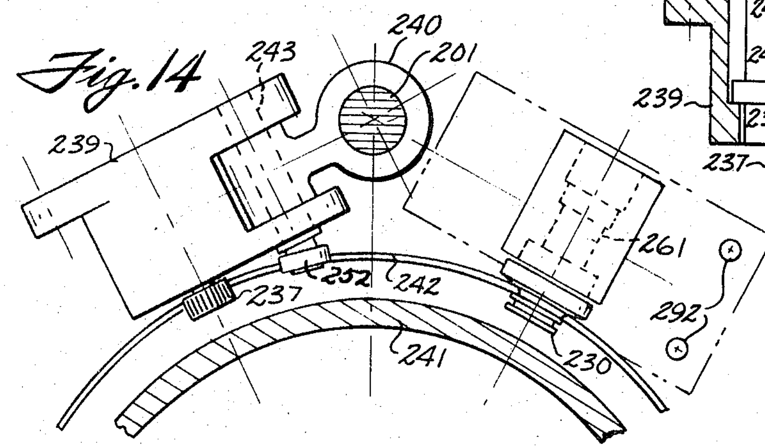
FIG. 14 is another vertical section with parts omitted, taken along line 14—14, of FIG. 12.

FIGS. 12 to 14 show another modification wherein only a single pivot or hinge joint 201 is used to adjust the carriage to different diameters of work. In this case there is no rigid frame other than shaft 201 and parts clamped to it. Reliance for dimensional stability is placed on this shaft which also forms the axis for angular adjustment. Two half-frames, 203 at the right and 205 at the left, are mounted on shaft 201, the right frame being securely pinned thereto at 206 and 207 through its ears 208 and 209. The left frame 205 has ears 211 and 212 at front and back, formed to receive slotted expandable bushings 213 and 214. Tapered bores are formed in shaft 201, which is of resilient steel; these are threaded internally and surrounding wall parts are split at 215 at its forward and 216 at its rearward end. The reason for splitting or slitting walls surrounding these taper bores longitudinally of the shaft as at 218, FIG. 13, is to permit their expansion when taper plugs 219 and 220 are forcibly screwed into the respective bores. Each such plug has a socket 222 for a suitable wrench, e.g., an Allen wrench. When the plugs are tightened into the tapered bores 215 and 216, the split shaft ends expand, forcing the split bushings 213 and 214 also to expand and thus lock shaft 201 securely against relative movement inside the ears 211 and 212. This arrangement avoids wear in the ears; bushings can easily be replaced if needed. Such locking, after the half frames have been set to the desired angle with respect to each other, holds the carriage sufficiently rigid to travel and perform its functions with the necessary accuracy. The guide band 242 is shown mounted on the pipe or work member 241, FIG. 14.

As in the case of the previous examples, the front guide rollers are idlers 228 and 230, respectively, set in their bearings 232 and 234 in the respective left and right frames 205 and 203. A right rear idler guide roller 235 is set in a housing 259, pivoted to the frame 203 at 261. This idler is directly in line behind the front roller 230. A driver roller 237 with its drive motor and associated gear mechanism 238 is similarly set in left rear housing 239. The latter is pivotally secured at its right end to a bracket or ear 240 which is integral with or rigidly fastened to the left half frame 205. A pivot shaft 243, shown extending vertically in FIGS. 12 and 13 (representing infinite radius or straightline travel) and as slanting towards the left in FIG. 14 when set for small radius work, is pinned to ear 240 at 245 to prevent relative rotation of the shaft in the ear. Sealed ball bearings 246 and 247 mount the upper and lower ends of the shaft 243 in the housing 239, through upper and lower extensions 248 and 249 thereof.

Fitted in the lower end of shaft 243, FIG. 13, and extending at a small angle to the axis of the shaft is a stub shaft 250 which supports a sealed ball bearing 251 the outer race 252 of which act as a track-engaging carriage retention roller. The latter thus is a smooth surfaced retainer adapted to roll with minimal friction against the rear edge of band 242 as the carriage travels. The angle between the axes of shafts 243 and 250 is calculated to approximate the median between extremes of adjustment, which will most nearly permit rolling contact between roller 252 and the edge of the guide band 242 under all conditions of use. When the carriage is adjusted for larger or smaller diameters than the median or average, there will necessarily be some departure from true rolling contact but not enough sliding contact to cause serious wear problems.

The purpose of retention roller 252 is to keep the carriage properly on the track and aligned with the track when the driver roller 237 is not engaged but idler 235 is engaged with it. This arrangement permits the carriage to be traversed by hand around the track without coming off or being displaced or misaligned. Since roller 252 has no grooves or flanges, it does not need to be backed away from the edge of the band to release the carriage. As long as the carriage is held on the band by another means, such as flanged guide idler 235 at the right rear, and by the front rollers 228 and 230, it cannot be displaced and roller 252 merely keeps it in line.

The housing 259 is similar to housing 239 but reverse handed. Housing 239 is pivoted on shaft 243, as previously explained, whereas the housing 259 is pivoted to half frame 203 by a vertical shaft 261 in suitable sealed bearings 262. Both housings 239 and 259 are adapted to be moved about their pivots by linkage designed selectively to lock them in operating positions or to release them. Housing 259 is connected by arm 264 to a link 263, the forward end of which is pivotally connected to a rotatable arm 265 at 266. The other or leftward end, FIG. 12, of arm 265 is pivotally connected at 267 to a slidable plunger 268 adapted to press against a compression spring 269 housed in a barrel 270 which is pivoted to the half frame 203 at 272. Stop surfaces on arm 265, not shown, limit the rotation of this arm to an inner lock position and to an outer release position. The former position is shown in the left side of FIG. 12. When arm 165 at the right is rotated clockwise, plunger 268 is forced inward into barrel 270 to compress the spring 269. As the pivot connection 266 to link 263 goes past center, with a toggle like action, the parts are locked, with the guide roller 235 holding the carriage on the track 242.

The arrangement for driver roller 237 and its drive mechanism at the left is similar. A link 275, connected at 276 to member 239, has its opposite or front end pivoted at 277 to arm 278, the latter being pivoted at 279 to plunger 280. The latter compresses a spring 281 in barrel 282, which is pivoted at 283 to an element of frame 205. The parts are shown in locking position in FIG. 12. Clockwise rotation of this arm 278 will release the drive roller 237 from engagement with the rear edge of track or band 242. However, this does not move the retention roller 252 at all, since the latter is mounted on the shaft 243 about which the housing 239 rotates.

The control box 290 is mounted on the right half frame 203 and the front face of this frame is drilled and tapped at 292 to receive the operating mechanism, such as a welder head or other tool to be transported by the carriage. As shown in FIG. 14, the rollers which exert pressure on the edges of the band, such as the front flanged idler guide 230 and friction drive roll 237 at the rear, as well as idlers 228 and 235, not shown in this Figure, are all arranged equidistantly from the hinge axis or shaft 201. These distances correspond to X in the previous Figures.

The system of FIGS. 12 to 14 has the advantage of simplicity, so far as the pivoting of two half frames about a single pivot axis is concerned. For heavy duty, it may somewhat lack the rigidity, with the swing rear pivots, of the previously described modifications. Also, the front guide rollers 230 and 228 cannot conveniently be spaced quite as far apart as those in FIG. 3. The compression spring tension means for holding the rear rollers against the band, plus the multiplying leverage in the way housings 239 and 259 are mounted, have some advantages over the tension springs of FIG. 9. On the other hand, the pressure exerted by compression springs may be excessive if the springs such as 36 of FIG. 3 are substantially "bottomed" by tightening the plugs 37. In general, of course, the pressure required to maintain driving contact between a driver and the edge of the band is much greater than that merely required to keep the idlers in guiding and retention contact.

Figure 15:
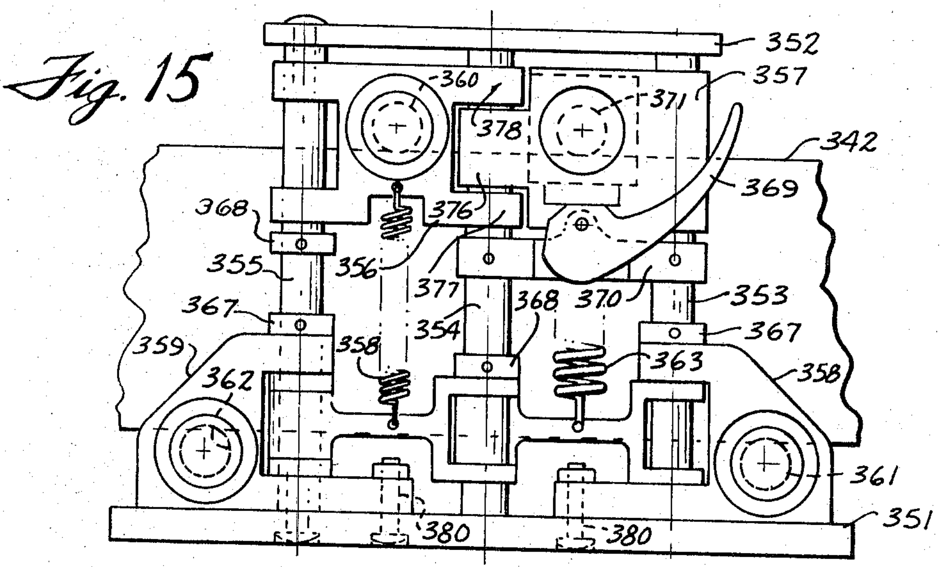
FIG. 15 is a plan view of another modification.

FIG. 15 shows another modification which combines certain features of FIGS. 3 and 9. As in FIG. 3, the carriage depends mainly for its rigidity on a single front plate 351 but as it uses three hinge or pivot axes, a rear plate 352 is fitted to the rear ends of the pivot shafts 353, 354 and 355. The middle shaft, 354, is firmly fixed to both plates, the other two shafts having their front and rear ends mounted in slots, not shown but much as in FIG. 4, described above. Housings 356 and 357 are provided for the rear idler guide roller 360 and for the driver mechanism 371 respectively, these being of much the same configuration as housings 160 and 170, respectively, of FIG. 9. C-shaped brackets 358 and 359 serve as housings, respectively, for front idler guides 361 and 362. These C-members are clamped to the front frame 351 in the same manner as are members 54 and 55, FIG. 3. Housings 356 and 357 are slidable on the shafts 354, 355, and 354, 353, respectively, in the same manner that the housings in FIG. 9 are. A heavy tension spring 363 tends to hold housing 357 forward, with drive roller means 371 in tight contact with the rear edge of band 342. A lighter spring 358 pulls housing 356 forward, tending to hold guide idler roll 360 in carriage retaining engagement with the back edge of band 342, unless this is prevented by a stem 376 of T-shaped housing 357 which embraces and slides on shaft 354 between two ears 377 and 378 of housing 356. A cam lever 369, pivoted to frame or platform member 370, which bridges the shafts 353 and 354, has three separate pushing and retaining surfaces, like those of cam lever 177 of FIG. 9. When in position shown in FIG. 15, the drive 371 is in engagement with the band 342. In the intermediate position, the housing 357 is pushed rearwardly far enough to disengage the drive 371 from the band but not far enough to disengage idler or guide roller 360. Clearance between elements 376, 377 and 378 allows this motion. If the cam lever is turned clockwise to the extreme position, housing 357 is moved still further to the rear and so is housing 356. This releases the guide and retention roller 360 and the carriage can then be lifted off the band 342. Collets 367 and 368 prevent or limit sliding of the housing members on the shafts 353, 354 and 355 in the same manner as explained above in connection with FIG. 9. The manner of fixing the shafts 353 and 355 to the front and rear plates, through arcuate slots centered about the main axis shaft 354, and the supplemental bolts 380 which further insure that the shafts 353 and 355 and the brackets 358 and 359, which swing with their shafts 353 and 355 about the central shaft 354, shall not shift after adjustment, are similar to the arrangement of like parts 71, 72, 73, etc., of FIG. 4 and need not be further described. The tension springs 358 and 363 of course swing with members 371 and 370, to which they are attached.

The system of FIG. 15 thus combines the advantages of that of FIG. 3, including the wide stance between the front guides and consequent high stability of carriage guidance, with the simple and effective tension controls over the drive and guide rollers at the rear, as in FIG. 9. Obviously, other features of the various modifications can be similarly combined where desired.

Figure 16:
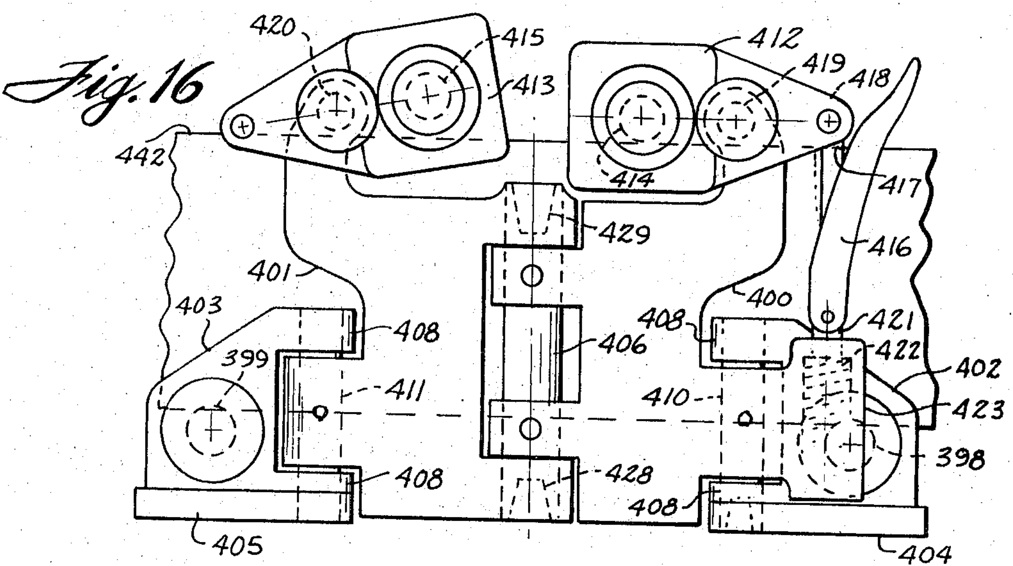
FIG. 16 is a similar view of still another modification.

FIG. 16 shows still another system, combining split frame features of FIG. 12, the C-clamp mountings for the front guide wheels, with the outboard arrangement of FIG. 3 and the compression spring toggle arrangement of FIG. 3, plus the pivoted mountings for the rear guide and drive rollers as in FIG. 12. In the case of FIG. 16, however, the housings for the rear rollers are pivoted at intermediate points and carry the rollers at ends opposite to the connections which provide force for maintaining them against the guide band. The rear track contact members being inboard of the front guide elements 398 and 399, an extra retention member at the rear is not needed.

More specifically, two half framemembers 400 and 402 are secured together for relative angular adjustment about an axis or main shaft 406 in the same manner as the half frames in FIG. 12, the right hand member 400 being pinned to shaft 406. C-members 402 and 403 which serve as housings for the two front guide idlers 398, 399, have front surfaces 404 and 405 adapted for attachments of the working instruments, such as welder head, torch cutter, heat treater, grinder, or the like, not shown and forming no part of the present invention. Arms 408 of the respective members 403 and 402 are mounted on the stub shafts 410, 411 which pivot the members 402 and 403 to the half frame members 400 and 401. Housings 412 and 413 support the rear idler and drive mechanisms and their bearings, shown respectively at 414 and 415, and are pivoted at 419 and 420 on the respective frame members 400 and 401. A lever 416, similar to the arrangement of FIG. 3, connects through link 417 to an arm 418 of pivoted housing 412 which can be rotated about its pivot mount 419, located between the arm 418 and the idler 414. The front end of lever 416 is connected to a plunger 421 adapted to compress a spring 422 inside barrel 423 of frame member 400.

The arrangement described is much like that of FIG. 3 and the lever 416 and associated parts act as toggle means in the same manner to apply the required pressure for driving engagement between the drive roller 415 and the rear edge of the guide track or band 442. The toggle arrangement of FIG. 12 may be substituted, if desired, to gain mechanical advantage. The parts are fixed in adjusted positions by tightening tapered threaded plugs 428 and 429 in split shaft ends, as described above for FIG. 12. As in the arrangements previously described, the bearings, seals and many other parts are "off the shelf" items, readily procurable, and components, in general, can be shifted bodily from the machine of the Miller and Nelson type to most of the modifications herein and between the various modifications. This gives the invention a desirable economic advantage.

Figure 17:
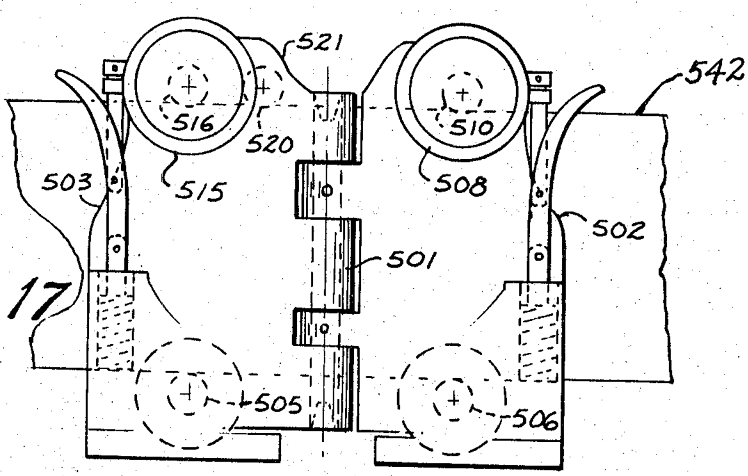
FIG. 17 is a plan view of still another modification.

FIG. 17 shows still another arrangement wherein only a single hinge axis is employed, as in FIG. 12, using eccentric mounting arrangements for rollers as in FIG. 3, but employing a separate retention or idler guide roller of unflanged type, analogous to the roller 252 of FIG. 13 but mounted independently of the driver housing.

Main axis shaft 501 secures together the right and left half frames 502 and 503 in much the same manner that the frames are pivoted in FIG. 12, each half frame carrying a front guide roller 505 and 506 and an integrally mounted rear housing. On the right frame, housing 508 supports idler roller 510 and its mountings, being of the eccentric type as in FIG. 3 and in the Miller and Nelson patent. The locking and releasing mechanism of toggle and plunger type is as in FIGS. 3 and 16 and need not be further described. On the left frame, the housing 515 supports the drive motor and gearing, not shown in detail, for the drive roller 516. The rear rollers 516 and 510 are directly in line, respectively, behind the front guide rollers 505 and 506, respectively, being also equidistant from the central axis 501. This axle shaft 501 is adapted to be firmly secured to the frame members 502 and 503 in the same manner as in FIG. 12 or FIG. 16 to keep the carriage rigid after adjustment.

Retention idler 520, is smooth surfaced and without flanges and is mounted in a rigid part 521 of the left frame member 503 laterally between front rollers 505 and 506 but close enough to the driver roller 516 that it will not be displaced too much from the tengential position, relative to the rear edge of the guide band 542, no matter how the half frames 502 and 503 are adjusted for different work curvatures or radii. Its contact surface is long enough, axially, to engage the rear edge of the band, even though the angular adjustment between the half frames tends to displace it from true tangential position. Hence, in any adjustment, retention roller 520 is there to keep the carriage from swinging forward and getting out of line when the drive roller 516 is released from driving engagement. The carriage cannot be lifted off the track or replaced on the track without releasing idler 510; roller 520, on the other hand, can be raised or lowered with respect to the band, as can roller 252 of FIGS. 12 to 14, so it does not hinder removal of or replacement of the carriage when the other retaining means are released but it does prevent misalignment when the drive is disengaged. Rollers 505, 506, 510 are all flanged.

In all the embodiments and modifications described above, it has been indicated that the driver roller, usually with knurled or fluted surface to increase its frictional drive engagement with an edge of the band, should be placed against the rear edge of the band. This is in fact a convenience arrangement and normally will be preferred. The presence of operating equipment, such as a welder head or other tool on the front of the carriage, makes the driver mechanism less accessible at the front than at the back of the carriage. Obviously, if desired, the driver could be placed at the front instead of the back by reversing the mounting and tensioning arrangements. Also, a flanged driver may be substituted for or used in combination with the usual knurled non-flanged drive roller. In example, it is possible where the load to be carried is heavy or the traction is not sufficient. This can be accomplished by substituting the rear idler unit for another motor drive unit having, however, a flanged drive wheel. Obviously, such variations come within the scope of the prevent invention.

Figure 18:
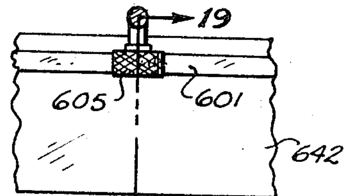
FIG. 18 shows a fragmentary plan view of a modified traction arrangement.
Figure 19:
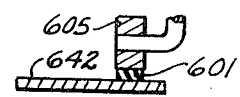
FIG. 19 is a sectional detail view taken along line 19—19 of FIG. 18.

FIG. 18 shows a plan view and FIG. 19 a sectional detail of a traction variation by which the driver means may engage a broader surface, such as the face or outer circumferential surface of the guide band. To increase friction, and thus obtain a more positive drive, the band, made usually of spring steel, is provided with a high friction surface of rubber or other plastic having the necessary properties, in the form of a strip 601 vulcanized or otherwise firmly secured to the band surface 642. The material selected should have good frictional properties and high temperature resistance, as the heat of welding or heat-treating operations can raise carriage temperatures despite the usual shielding. The drive roller 605, mounted on an axis parallel to the axis of curvature (to the central axis of the work) is driven by a motor mounted on the carriage in any suitable manner, as long as the relationship between the drive roller and the special friction surface can be properly maintained. The drive means is preferably held against the band by resilient pressure, so as not to allow slipping if slight irregularities in the band or in the friction surface strip 601 should occur. The driver mechanism must, of course, be so mounted that it can be moved away from driving contact, when desired, to permit shifting of the carriage manually to a starting position, for adjusting it to the track for smooth running and alignment, and for other usual purposes.

Running through all the various modifications described above is the concept that the carriage can be adapted by adjustment of relatively movable components to accommodate paths having flat curvatures (infinite radius) to small fixed radius profiles, provided the adjusted structure is rigid and dimensionally stable enough that it or its operations will not be distorted when adjusted to a different radius or curvature. Also required is that the carriage parts which contact and follow the track edges, i.e., those track components that are located in one or more planes parallel to the working plane, be equidistantly spaced from the transverse axis or axes about which the carriage or its components are to be adjusted angularly to conform to different work members and track profiles. Inherent also is the feature that the carriage must be kept in alignment on the track by having at least two spaced guiding or track-contacting elements which engage one of the track edges (since two points determine a straight line) and that there be at least one additional track contacting element spaced from these to contact another part, such as the opposite edge, of the track. This latter must also be between the first two in the direction of travel of the carriage, to prevent angular rotation or other misplacement of the carriage on the track when the drive roller is disengaged. It is noted that the drive member, when engaged, serves to hold the carriage in line by exerting a force against the track, for example against its back edge, opposite to the forces exerted by the guiding members on the other side, such as rollers 27 and 28 of FIG. 3.

It is also desirable that the drive means, usually a traction roller engaging the track by friction, be shiftable to disengage it from the carriage while the carriage is still retained on the track. As explained above, this makes it possible to move the carriage along the track manually, for initial positioning or other purposes.

In all modifications, the carriage must have unitary solidity and dimensional integrity, so that no deformation will occur under the normal stresses. It must travel with precision unaffected by adjustment of its parts to accommodate different curvatures or radii and regardless of the shifting of parts to accommodate such differences. The solid frame may be of various forms but always includes a rigid axle or shaft member which projects along and defines a main axis of adjustment, perpendicular to the working plane. The track-contacting elements are mounted in bearing or housing units that are interchangeable with each other and preferably also interchangeable with those which support the friction drive devices; e.g., the bearings and mounting for each of rollers 27 and 28 in FIG. 3 are interchangeable with each other and desirably interchangeable with the mounting for idler roller 29 in the same Figure. The latter, of course, is set eccentrically in its rotatable support. Members 27 have no such setting but drive roller 85 does and here the bearings and mounting elements are desirably interchangeable.. This makes for good flexibility in arrangement and facilitates repair and replacement of parts when required because of wear.

In setting the carriage for a new radius, as when switching to a different diameter of work, for example, a different diameter pipe line, the flexible track is first placed on the work member and drawn tight. The adjustable components of the carriage are loosened and the carriage is placed manually on the track, shifting the sub-frame elements until the guide rollers, especially the idlers, run freely and without binding when the carriage is traversed manually. These parts are then tightened firmly. A good fit is thus assured, making it unnecessary, as a rule, to use scales or verniers, although the latter may be used to make sure that the adjustments of the different parts are equalized or reasonably so. In a sense the carriage thus adjusts itself to the track.

The essential features just described pertain to all the embodiments but it is seen that some have certain desirable features while others have different features that are useful. The wide stance of the front idler guide rollers of FIG. 3 and of FIG. 15 is advantageous in giving maximum stability to the angle of intersection of a welding torch with the circumference of a pipe. The simple single axis design of FIGS. 14 and 17 has other advantages for some types of service. The multiple positions for guiding and driving rollers of FIG. 11 facilitates changing from single drive to double drive since the bearing assemblies for the idler 165 and the drive roller 172 are identical and readily interchangeable. This is advantageous where the instrument is unusually heavy or whereever traction conditions are difficult. However, the same advantages can usually be obtained by using a flanged drive roller in place of any one or more of the idlers, such as 27, 28, FIG. 3, or idlers 139, along the front edge of the track, FIG. 9, may be replaced by driven traction wheels, if desired.

It will be obvious to those skilled in the art that other changes may be made without departing from the spirit of the invention. Also, various features and subcombinations may be chosen from one modification and incorporated in another, or various parts may be interchanged or combined in ways other than those which are specifically described above. Other and equivalent or analogous variations, modifications, combinations, sub-combinations, and other changes, both in apparatus and in process or procedure will suggest themselves to those skilled in the art. It is intended that all such, to the extent that they are fairly within the scope and spirit of the present invention, shall be covered by the following claims, as far as the state of the prior art properly permits.

What is claimed is:

1. In an adjustable traveling carriage adapted to transport an operative instrument in a work plane which is perpendicular to the longitudinal axis of a cylindrical work piece whose radius may vary from piece to piece, said carriage being under guidance of a cylindrical surfaced track attached to a said workpiece with its central main axis in substantial coincidence with the workpiece axis, said track including a guiding element which is parallel to said work plane, the combination which comprises:

a. At least two subframes mounted for relative angular adjustment with respect to each other about an adjusting axis which is perpendicular to said element and said work plane, b. A tool supporting mount carried by at least one of said subframes, c. A track-following carriage guiding member mounted in each of at least two of said subframes and adapted to follow said track element for guiding the carriage movement with respect to the guide track, d. A driven traction member also mounted in a subframe for engaging said track to move the carriage with respect to said track, e. Means for locking said subframes rigidly in adjusted relationship to conform the carriage to said track, f. Each of said guiding members and traction member being located in its subframe on a line which is radial to said central main axis at a predetermined distance from a perpendicular to said line through an adjacent adjusting axis, offset from said axis along said perpendicular by a predetermined distance X.

2. A carriage according to claim 1 which includes a plurality of parallel adjusting axes and wherein the distance between any adjacent pair of said adjusting axes is 2X.

3. In a traveling carriage adapted to transport an operative instrument under guidance of a substantially cylindrical track, along a path which lies in a predetermined work plane and which path is subject to being curved to various radii to accommodate workpieces of varying curvatures, said carriage itself being adapted to be reshaped from time to time to accommodate said varying curvatures of work, said instrument transport path lying in a plane which is generally perpendicular to the workpiece being operated upon, the improvement which comprises in combination the following elements:

a. A front rigid member of the carriage which includes means for supporting said instrument in said predetermined work plane, b. At least one rigid pivot shaft secured to said rigid front member with its axis perpendicular to said work plane, c. A pair of sub-frames secured to said shaft for angular adjustment with respect to each other about the axis of said shaft, d. Means for securely locking said pair of sub-frames in a selected angular adjusted position to accommodate a predetermined and fixed curvature of the guide track, e. A track follower element mounted in each of at least two subframes for contacting the guide track and guiding the carriage with respect to the track, and f. A driven traction means in at least one of said subframes engageable with an element of said track to propel the carriage along the track.

4. An improvement in a carriage according to claim 3 in which each of said subframes carries a separate front rigid member.

5. An improved carriage according to claim 3 in which the rigid front member is provided with arcuate slots to lock additional shaft means in each subframe, said additional shaft means being parallel to and equally spaced from said rigid pivot shaft.

6. An improved carriage as in claim 5 in which side wing subframe members are mounted on said additional shaft means.

7. An improved carriage according to claim 5 in which side wing subframe members are mounted on said additional shaft means and in which each of said wing members includes a tang and a fastener for said tang to securely lock said wing members in adjusted positions.

8. An improved carriage according to claim 1 which includes an outboard frame pivoted to each of said subframes on an axis which is parallel to said perpendicular axis and equally spaced therefrom, a track follower element engaging a guiding element on the guidetrack and mounted in each of said subframes half-way between the rigid shaft and the adjacent parallel axis, and a motor-driven carriage-propelling member engaging an edge of the track opposite said guiding element for propelling the carriage along said track.

9. An improved carriage according to claim 3 in which the locking means for securing the subframes in angular adjusted position comprises a tapered threaded element inserted in a hollow end of the rigid pivot shaft, said shaft being split to expand and lock in a subframe fitted thereover when the tapered element is tightened into said hollow end.

10. An improved carriage according to claim 3 which includes three parallel pivot shafts and four subframe members.

11. An improved carriage according to claim 3 which includes three parallel pivot shafts, one of which is located intermediately between two inner subframes connected in hinged relationship to each other by the intermediate shaft, outer-subframes connected respectively to the other two shafts, track-contacting guide means on each of said outer subframes to guide the carriage around the work, and a motor-driven track-engaging drive roller mounted in one of said inner subframes for propelling the carriage around the work, all distances between any adjacent pair of said pivot shafts being equal.

12. An improved carriage according to claim 11 which includes a single rigid face plate for carrying the operating instrument.

13. An improved carriage according to claim 11 in which the track-engaging drive roller is sealed in its mounting by dirt-excluding O-ring means.

14. An improved carriage according to claim 3 in which the driven traction means include a non-flanged track engaging drive roller and a flanged track-engaging drive roller to provide supplemental traction.

15. An improved carriage according to claim 3 which includes a frame made up of four parallel equally spaced shafts, an intermediate and two outer subframe members each mounted on an adjacent pair of said shafts, an outboard guiding element on each of said outer subframe members, and a motor-driven track-engaging drive roller mounted in one of said sub-frame members.

16. An improved carriage according to claim 15 which includes a single rigid face plate joining together front ends of said four shafts for supporting said operating instrument.

17. A traveling carriage according to claim 3 which includes a first sliding subframe mounted for movement axially of the guide track on two parallel axes, in which an outer subframe pivots on either side of said axis carries a front track-engaging guide element, and in which said sliding subframe carries a rear track-engaging carriage drive roller element, and resilient tension means for holding said roller element in driving engagement with said track.

18. An improved carriage according to claim 17 in which a second sliding subframe is mounted on a pair of parallel axes to one side of center of the carriage and wherein said second sliding sub-frame is arranged to contact said first sliding subframe after sliding a small distance to release the roller from track-engaging contact after said second subframe is moved said small distance.

19. An improved carriage according to claim 3 which includes:

a. A shaft member arranged along an adjusting axis and substantially perpendicular to the work plane;

b. A subframe member secured on either side to said shaft member for relative angular movement about said adjusting axis;

c. A track-contacting member mounted in the rear of each of said subframes and tension means for holding each of said last named contacting members in track engaging position;

d. A carriage guiding element mounted in the front of each of said subframes to guide said carriage in its travel around the workpieces, and e. An unflanged retention member mounted at a rear portion of the carriage to keep the carriage on the track when either or both of the rear tensioned track-contacting members are disengaged from contact with the track.

20. An improved carriage according to claim 3 in which guiding elements and traction means are in alignment axially of the guide track and including a non-aligned track engaging element to retain carriage on the track when one or more guiding elements or traction means is disengaged from the track.

21. An improved carriage according to claim 3 which includes track-contacting members at the rear of the carriage pivotally mounted for shifting movement towards and away from the rear edge of the track.

22. An improved carriage according to claim 21 in which an elongated over-center toggle means is included for holding the rear track-contacting members against the track edge.

23. An improved carriage according to claim 3 which includes three parallel shaft members arranged in a series, the outer two of said shafts being equally spaced from the middle shaft, two intermediate subframe members secured to the middle shaft for relative angular adjustment about said shaft, outboard subframe members secured respectively to the outer shafts, a track contacting and guiding element secured in the front of each of said outboard subframes, and a rigid front plate for locking all said shafts and subframes firmly in selected angular adjustments and for carrying the operative instrument.

24. An improved carriage according to claim 23 which also includes a rigid rear plate for further securing said shafts and subframes in said selected angular adjustments.

25. An improved carriage according to claim 3 which comprises a rigid structure when the sub-frame parts are locked together but wherein said sub-frames are freely adjustable when not locked, including three parallel shaft members, four subframes of which two are intermediate and each is secured to a right or left pair of said shafts and the other two subframes are each secured in cantilever fashion to an outer one only of said shafts, a relatively movable track-contacting element mounted on each of two of said subframes for selectively engaging the rear edge of the track releasable resilient locking means for holding each of said controlling elements under tension in said rear-edge engaging position, and a track-engaging guide roller mounted in each of said cantilevered subframes for contacting the front edge of the track and guiding the carriage around said guide track.

26. An improved carriage according to claim 3 which includes a motor-driven traction roller for engaging a cylindrical surface of the track to move the carriage along the track.

* * * * *